United States Patent
Ickman et al.

(10) Patent No.: US 8,423,088 B2
(45) Date of Patent: Apr. 16, 2013

(54) AGGREGATED, INTERACTIVE COMMUNICATION TIMELINE

(75) Inventors: Steven W. Ickman, Snoqualmie, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 12/507,144

(22) Filed: Jul. 22, 2009

(65) Prior Publication Data

US 2011/0021250 A1    Jan. 27, 2011

(51) Int. Cl.
*H04M 1/00* (2006.01)

(52) U.S. Cl.
USPC ........... 455/566; 345/440; 715/207; 715/700; 715/814

(58) Field of Classification Search .................... 455/566
See application file for complete search history.

(56) References Cited

U.S. PATENT DOCUMENTS

| | | | |
|---|---|---|---|
| 5,796,356 A * | 8/1998 | Okada et al. ..................... | 341/51 |
| 5,812,124 A * | 9/1998 | Eick et al. ........................ | 725/45 |
| 5,822,523 A * | 10/1998 | Rothschild et al. ........... | 709/236 |
| 6,018,766 A * | 1/2000 | Samuel et al. ................. | 709/218 |
| 6,154,600 A * | 11/2000 | Newman et al. .............. | 386/281 |
| 6,226,686 B1 * | 5/2001 | Rothschild et al. ........... | 709/245 |
| 6,446,125 B1 * | 9/2002 | Huang et al. ................... | 709/226 |
| 6,452,615 B1 * | 9/2002 | Chiu et al. ...................... | 715/776 |
| 6,799,246 B1 * | 9/2004 | Wise et al. ...................... | 711/117 |
| 6,844,887 B2 * | 1/2005 | Laffey et al. ................... | 715/861 |
| 7,068,762 B2 | 6/2006 | Skladman et al. | |
| 7,069,003 B2 * | 6/2006 | Lehikoinen et al. ........ | 455/414.2 |
| 7,072,296 B2 * | 7/2006 | Turner et al. ................ | 370/230.1 |
| 7,237,187 B2 * | 6/2007 | Neal et al. ...................... | 715/273 |
| 7,290,057 B2 * | 10/2007 | Saunders et al. .............. | 709/231 |
| 7,313,755 B2 * | 12/2007 | Rahman et al. ............... | 715/203 |
| 7,325,199 B1 * | 1/2008 | Reid .............................. | 715/723 |
| 7,353,466 B2 * | 4/2008 | Crane et al. .................... | 715/752 |
| 7,373,614 B1 * | 5/2008 | Holmes .......................... | 715/855 |
| 7,567,846 B2 * | 7/2009 | Sztybel .......................... | 700/94 |
| 7,634,497 B2 * | 12/2009 | Passerini et al. ...................... | 1/1 |
| 7,730,407 B2 * | 6/2010 | Chiu et al. ..................... | 715/732 |
| 7,779,151 B2 * | 8/2010 | Major et al. ................... | 709/236 |
| 7,797,620 B2 * | 9/2010 | Fukuda et al. ................. | 715/202 |
| 7,800,615 B2 * | 9/2010 | MacPherson ................. | 345/440 |

(Continued)

OTHER PUBLICATIONS

"PeeKaWho and Aerize Email Alerts—Keep on Poppin!", Retrieved at <<http://crackberry.com/peekawho-and-aerize-email-alerts-keep-poppin>>, May 14, 2009, pp. 1-11.

(Continued)

*Primary Examiner* — Hai Nguyen
(74) *Attorney, Agent, or Firm* — Gonzalez Saggio & Harlan LLP

(57) ABSTRACT

Described is a technology by which an interactive timeline user interface shows communication data aggregated from various sources (e.g., a telephone service, a website, an application and/or the like) in time order. To reduce the number of items in the timeline, certain items may be combined into a compressed item, e.g., items from the same source and/or of the same type may be rolled up into a rolled up item. The user may also interact to reply to a data item. For example, an editor may be provided upon interaction with a data item in the timeline, and the type of reply that is sent may automatically match the type of data item, (e.g., a text message reply to a text message).

20 Claims, 6 Drawing Sheets

U.S. PATENT DOCUMENTS

| | | | | |
|---|---|---|---|---|
| 7,818,773 | B2* | 10/2010 | Yurt et al. | 725/93 |
| 7,877,689 | B2* | 1/2011 | Gilley | 715/723 |
| 7,934,159 | B1* | 4/2011 | Rahman et al. | 715/716 |
| 7,937,740 | B2* | 5/2011 | Shusman | 725/135 |
| 7,941,739 | B1* | 5/2011 | Mohammed et al. | 715/202 |
| 8,010,903 | B2* | 8/2011 | Dieberger et al. | 715/764 |
| 8,037,046 | B2* | 10/2011 | Udezue et al. | 707/706 |
| 8,069,466 | B2* | 11/2011 | Shelton et al. | 725/134 |
| 8,230,333 | B2* | 7/2012 | Decherd et al. | 715/243 |
| 8,255,966 | B2* | 8/2012 | Shusman | 725/114 |
| 2002/0120935 | A1* | 8/2002 | Huber et al. | 725/60 |
| 2002/0188958 | A1* | 12/2002 | Miller | 725/112 |
| 2003/0122874 | A1* | 7/2003 | Dieberger et al. | 345/764 |
| 2003/0145277 | A1* | 7/2003 | Neal et al. | 715/509 |
| 2003/0196206 | A1* | 10/2003 | Shusman | 725/91 |
| 2004/0169683 | A1* | 9/2004 | Chiu et al. | 345/776 |
| 2005/0075097 | A1* | 4/2005 | Lehikoinen et al. | 455/414.1 |
| 2005/0268237 | A1* | 12/2005 | Crane et al. | 715/732 |
| 2006/0089147 | A1* | 4/2006 | Beaty | 455/445 |
| 2006/0101035 | A1* | 5/2006 | Mustakallio et al. | 707/100 |
| 2006/0236219 | A1* | 10/2006 | Grigorovitch et al. | 715/500.1 |
| 2006/0271976 | A1* | 11/2006 | Yurt et al. | 725/87 |
| 2007/0088768 | A1* | 4/2007 | Passerini et al. | 707/203 |
| 2007/0171224 | A1* | 7/2007 | MacPherson | 345/440 |
| 2007/0245238 | A1* | 10/2007 | Fugitt et al. | 715/700 |
| 2007/0282959 | A1 | 12/2007 | Stern | |
| 2007/0283039 | A1 | 12/2007 | Kim et al. | |
| 2008/0172746 | A1 | 7/2008 | Lotter et al. | |
| 2008/0208631 | A1* | 8/2008 | Morita et al. | 705/3 |
| 2008/0235108 | A1* | 9/2008 | Kulakowski et al. | 705/26 |
| 2008/0235763 | A1* | 9/2008 | Krantz et al. | 726/2 |
| 2008/0288605 | A1* | 11/2008 | Major et al. | 709/207 |
| 2008/0294663 | A1* | 11/2008 | Heinley et al. | 707/100 |
| 2008/0306959 | A1 | 12/2008 | Spivack et al. | |
| 2009/0006475 | A1* | 1/2009 | Udezue et al. | 707/104.1 |
| 2009/0006771 | A1* | 1/2009 | Freeman et al. | 711/147 |
| 2009/0055735 | A1* | 2/2009 | Zaleski et al. | 715/700 |
| 2009/0083664 | A1* | 3/2009 | Bay et al. | 715/814 |
| 2009/0083787 | A1 | 3/2009 | Morris | |
| 2009/0138508 | A1* | 5/2009 | Tolle et al. | 707/104.1 |
| 2009/0167553 | A1* | 7/2009 | Hong et al. | 340/825.29 |
| 2009/0172511 | A1* | 7/2009 | Decherd et al. | 715/207 |
| 2009/0319539 | A1* | 12/2009 | Soppet et al. | 707/100 |
| 2010/0088664 | A1* | 4/2010 | Khodabandehloo et al. | 717/103 |
| 2010/0093316 | A1* | 4/2010 | Doppler et al. | 455/414.1 |
| 2010/0100899 | A1* | 4/2010 | Bradbury et al. | 725/29 |
| 2010/0115443 | A1* | 5/2010 | Richstein | 715/771 |
| 2010/0125791 | A1* | 5/2010 | Katis et al. | 715/716 |
| 2010/0167712 | A1* | 7/2010 | Stallings et al. | 455/418 |
| 2010/0180001 | A1* | 7/2010 | Hardt | 709/207 |
| 2010/0218118 | A1* | 8/2010 | Bronkema | 715/751 |
| 2010/0250643 | A1* | 9/2010 | Savage et al. | 709/202 |
| 2011/0112952 | A1* | 5/2011 | Annunziata et al. | 705/37 |
| 2012/0005209 | A1* | 1/2012 | Rinearson et al. | 707/737 |

OTHER PUBLICATIONS

"Aerize Email Alerts—Email / SMS Popup Notifications", Retrieved at <<http://software.crackberry.com/product.asp?id=21671&n=Aerize-Email-Alerts---Email-/-SMS-Popup-Notifications>>, May 14, 2009, pp. 1-2.

"BerryBuzz—Custom LED Colors, Repeating Alerts and More!", Retrieved at <<http://software.crackberry.com/product.asp?id=26168&n=BerryBuzz---Custom-LED-Colors%2C-Repeating-Alerts-and-more!>>, May 14, 2009, pp. 1-2.

"Unified Messaging", Retrieved at <<http://en.wikipedia.org/wiki/Unified_messaging>>, Unified messaging—Wikipedia, the free encyclopedia, May 14, 2009, pp. 1-2.

Chartier, David, "Hands on: Swurl Aggregates Your Web Life", Retrieved at <<http://arstechnica.com/software/news/2008/07/hands-on-swurl-aggregates-your-web-life.ars>>, May 19, 2009, pp. 1-3.

"Timeline Activity Feed", Retrieved at <<http://community.spiceworks.com/help/Timeline>>, May 19, 2009, pp. 1-3.

* cited by examiner

US 8,423,088 B2

AGGREGATED, INTERACTIVE COMMUNICATION TIMELINE

BACKGROUND

Contemporary operating systems, including operating systems for hand-held computing devices and mobile telephones, have an application-centric user experience. To access content, the user selects an application from a list or from a set of icons, or browses a set of files to select a file, which in turn loads the appropriate application (if not already loaded) and opens the file in that application.

As a result, the user either accesses information by folder or type (e.g., photographs, documents, and the like) or by application (e.g., an email application, a text (SMS) application, a web service such as for social networking, and so forth. This provides a user experience that does not fit well with how many users communicate with other users, given the variety of communications options available to users today.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which communication data from various sources (e.g., a telephone service, a website, an application and/or the like) are aggregated into data items that are then output in time order on an interactive timeline user interface. To reduce the number of items in the timeline, certain items may be combined into a compressed item. For example, items from the same source (which may be a group), and/or of the same type, may be rolled up into a rolled up item, and the number of comments associated with an item may be limited when showing the timeline, e.g., to show only the most recent comment. Data corresponding to a compressed item may be expanded by user interaction with the compressed item.

In one aspect, the user may interact to filter the communication data so as to include only items corresponding to a certain type and/or source of the communication data. The communication data may be re-synchronized in different ways depending on its source, e.g., on an interval for RSS web content, on demand for telephone service content (e.g., calls and/or text messages) and so forth.

In one aspect, the user may reply to a data item. For example, an editor may be provided upon interaction with the timeline, and the type of reply may match the type of data item, e.g., an SMS reply to an SMS message, a social networking post in reply to social networking content, and so forth.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a communication "feed" timeline that aggregates and shows certain communication data (including content and/or notifications) from various sources, in an integrated timeline. This allows the user to have his or her communication data appear in a time-based user experience, as well as to converse back to the source in a consistent way. The timeline system may replace the desktop (and/or grid/list of application icons) as the "finder" or central organizing screen for a computing device or telephone, by default on a device or by entering a timeline mode, for example.

As used herein, "communication data" include any type of content, metadata and/or notifications that become available or is known, e.g., received text (e.g., SMS or MMS) messages, telephone calls (including missed calls), social networking content posts, notifications and/or status updates, microblog (e.g., Twitter®) content, file content (e.g., photograph) changes to a monitored folder or other site, RSS feeds, (e.g., news articles, sports articles, and so forth), desktop notifications, email, as well as notifications from applications. Note however that these are non-limiting examples of communication data, and the technology described herein can aggregate and integrate such information from any source, including from sources not yet known.

While some of the examples described herein are directed towards a computing device in the form of a mobile telephone, it is understood that any device having communications capabilities and/or a user interface may benefit from the technology described herein, including devices that are generally not considered portable. Further, the device that contains the communication data need not contain the communication timeline program; for example, a user may couple a mobile device to another computer system to provide the other computer system with communication data, and have that computer system provide the communications timeline interface. Similarly, the communication data may be maintained in a cloud service.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and communication of information in general.

Figure 1:
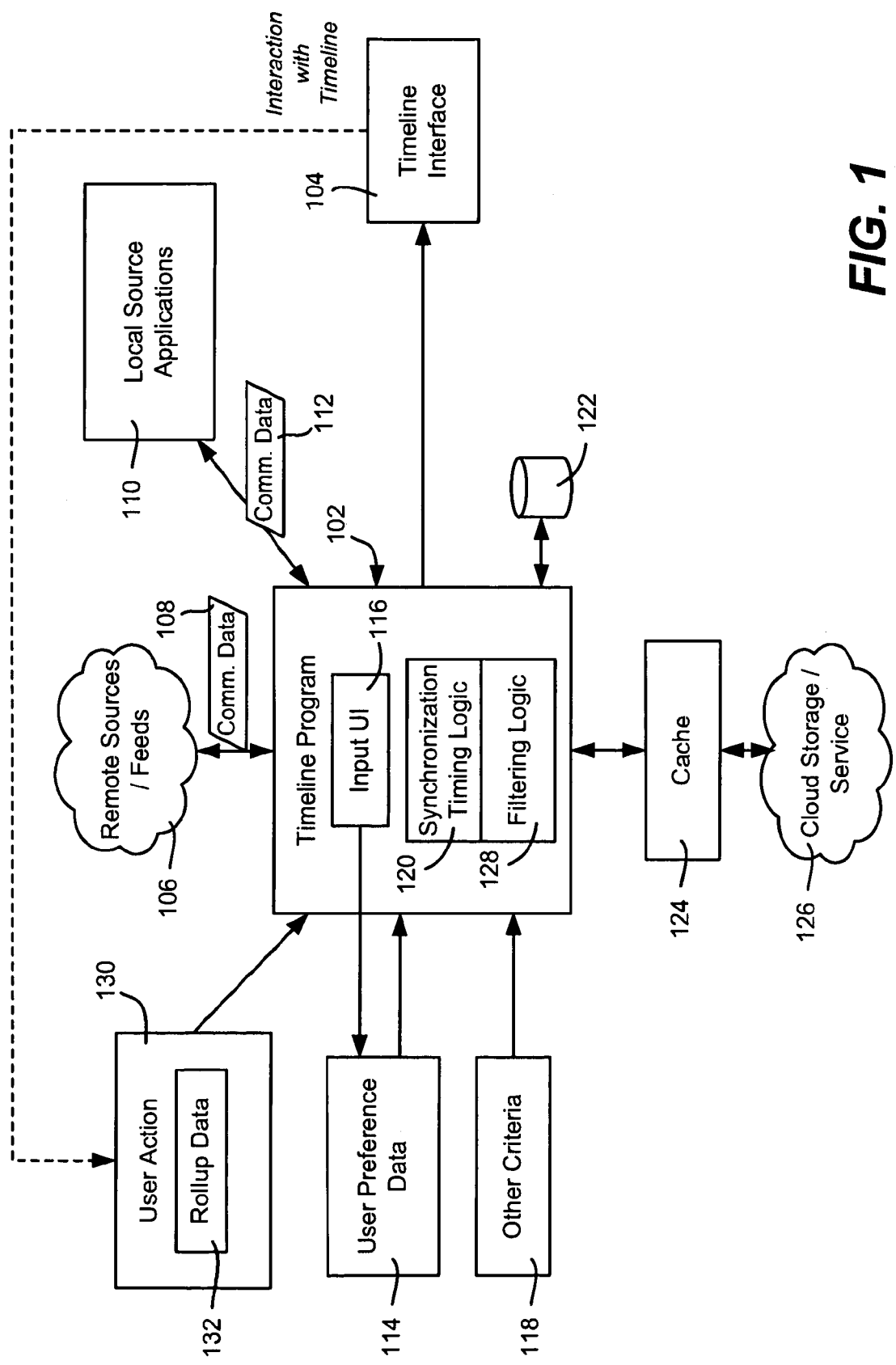
FIG. 1 is a block diagram showing an example implementation of aggregating communication data into a timeline view.

FIG. 1 shows an example in the form of a timeline program 102 by which a user views communication data organized by time, that is, in a timeline interface 104. In general and as described below, the timeline interface 104 shows a representation of the communication data as various items (single items, threads and rollups, described below), sorted by time. The timeline program 102 may be an application program, an operating system component, built into a file system, and so forth. Further, some or all of the timeline program 102 may be run in a cloud service, although as can be readily appreciated, some functionality may be local so as to provide for operation when no connection to the cloud service is present.

In general, various remote sources 106 such as from websites, RSS feeds, communication services (e.g., telephone and SMS), remote applications and the like provide communication data 108 in the form of content and/or metadata to the timeline program 102. The communication data 108 may be pushed or pulled by the timeline program 102. In one implementation, for each type of data, a plug-in program or the like referred to as a "connector" accesses (e.g., pulls and/or pushes) the data and formats it as appropriate for consumption by the timeline program 102; in this way, each source of communication data, which knows how to access its own data, may thus participate simply by providing a connector appropriately configured to its needs.

In addition to remote communication data, local source applications 110 may provide other communication data 112 for integration into the timeline, e.g., again via a suitable connector. This allows communication data such as notifications (e.g., events, calendar data and so forth) as well as file-related data to be entered as items in the timeline. For example, a user may want calendar items to appear on the timeline. Similarly, whenever a user takes a photograph, the camera application can add an item corresponding to that photograph to the timeline. Note that this may be directly from the application, or accomplished by monitoring a folder, e.g., the file system, a driver, a background execution thread or the like monitors a "pictures" folder that results in changes to the timeline when the folder contents are changed. As other examples, a music player can add items for each track the user listens to, (although such items may be rolled up into a playlist item, as described below); television shows watched, games played (with scores) and so forth can similarly contribute items.

In general, any of the items appearing on the timeline are user configurable. For example, one user may want photographs included, whereas another user will not. Further, as described below, the user can filter which items appear, including by source and/or by type of items.

In general, incoming (inbox) email is not included in the timeline, so as to not overwhelm the number of items appearing in the timeline interface 104. Instead, a user may quickly switch to an email application (e.g., via a tab) to read and send email messages. However, if a user replies to an email message, the corresponding email message thread may have an item added to the timeline representing that thread. Any replies to that reply update the timestamp of the thread, and thus may move the thread's position within the timeline. A new email message sent by a user may be included in the timeline, in which event an item for that communication is added to the timeline, with the thread's time updated whenever any further replies take place.

However, a user may choose to include incoming email messages, (as with other aspects herein, much of the functionality is user configurable). Further, if emails are included, a user may filter which emails are included, e.g., emails received from the user's boss (which are likely important to that user) may be included, but no others.

For sources corresponding to a user account, the user configures the system with the appropriate account information (e.g., credentials) for the sources to be aggregated into the timeline view. Some sources can be configured automatically/by default for the user (e.g., call history, or SMS sources when on a text-message capable device), while others may be manually configured (e.g., social networking or microblog sources). In FIG. 1, the user preference data block labeled 114 represents any user customizations and configuration data. The input user interface (UI) 116 allows the user to set such preference data 114.

In addition to user preferences, other criteria 118 (e.g., state data) may be used to determine operation. For example, the system may operate differently when memory is low, power is low, and so forth. A user may want the timeline program to operate differently on weekends as opposed to workdays.

Once configured, the system (the timeline program 102 including synchronization timing logic 120) automatically synchronizes communication data from the various sources 106, 110 to a local database 122 on a periodic basis. The interval at which items are synchronized for a source may vary, which may be user configurable, or possibly determined by an algorithm. For example, a user may want missed telephone call and received text messages synchronized so as to appear in the timeline as soon as possible, but only have RSS feeds synchronized hourly. In one implementation, the user can trigger a manual synchronization of a source (or all sources) at any time, e.g., via a menu item.

The content itself may not be present on the device until requested. For example, a user may see an item in the timeline, corresponding to metadata about a piece of communication data, but the content may not be downloaded until needed, if ever. In this manner, for example, a user can see that a new article has been published by a news feed, and only access the content on demand, if desired.

Further, rather than maintain all of the metadata and/or content in a local database 122, the timeline program (or another program) may cache and store items via a cache 124 and cloud storage/service 126. For example, older items or least frequently used items that are part of the timeline may be automatically cached/remotely stored. The metadata for remotely stored content may be kept locally so as to rapidly show entries for items that exist, regardless of whether there is a connection to the cloud service 126.

Figure 2:
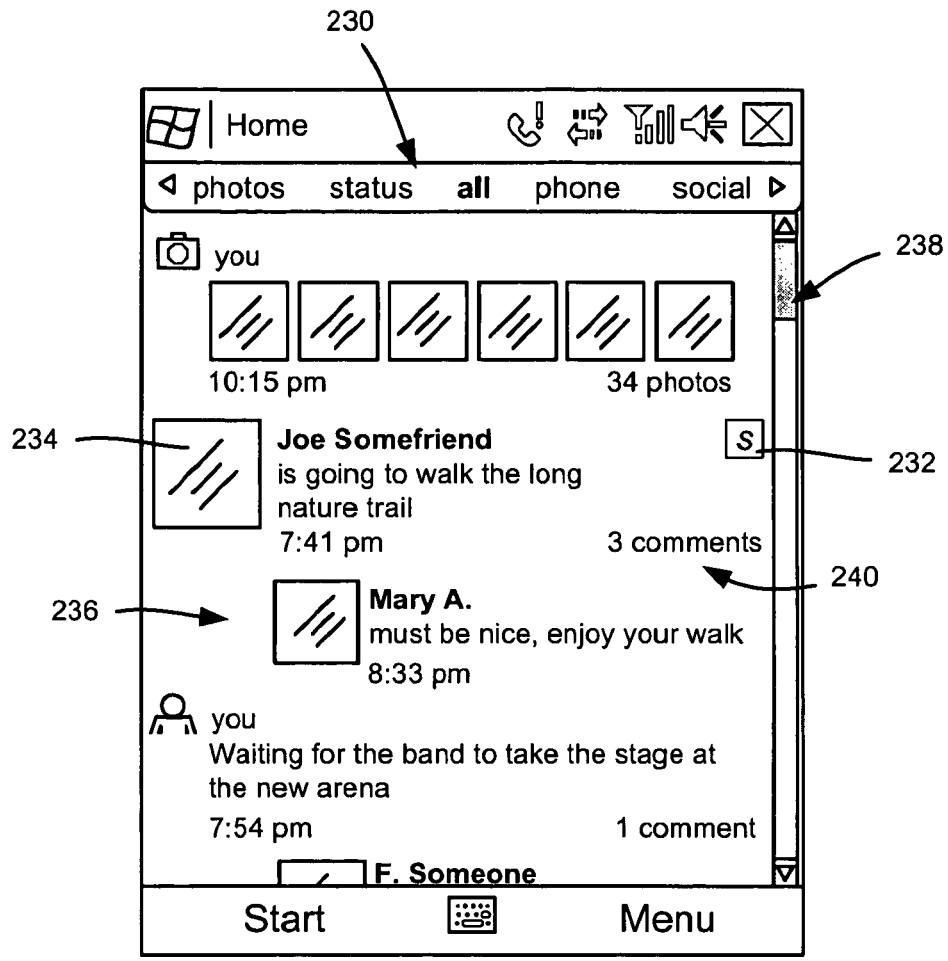
FIG. 2 is an example of a timeline view on a user interface showing communication data aggregated from different sources as interactive items.

As represented in FIG. 2, items that have been synchronized from sources on the users' behalf are presented to the user in the form of the timeline interface 104, which is filterable. Via filtering logic 128 (FIG. 1), the user can see the items from all sources sorted by date/time, or the user can select a filter (via the choices 230) associated with the timeline to show items from a specific source, or items of a specific type. The system does not specify the types of items that can be displayed on the timeline, but typical item types may include sent and received text messages (SMS), missed calls, status updates from social networking or microblog services, and news posts from RSS-based sources.

The actual information shown for an item in the timeline may vary by source and type, as generally represented in FIG. 2. For example, an icon 232 may represent an item's type (social network), and an icon 234 (such as a picture) may represent the item's source. For some item types (like status updates) the item's type icon may be replaced with the thumbnail of the sender and for other item types (like photos) the description text may be replaced with a thumbnail representation of the item.

Text may display the name of the item's author, a brief text description of the item, date the item was sent, and an optional count of the number of comments for the item. Note that as described below, one comment 236 (e.g., the most recent may be shown), which may be indented, include a picture of the source sender, text and time.

As can be readily appreciated, there may be a significant number of entries in the timeline, particularly if the user adds a lot of sources. While a scrollbar 238 helps the user to navigate through the timeline while providing some visible context as to the user's location within the timeline, the user may still be presented with a very large number of entries/items.

To avoid having too many entries, the concept of "timeline compression" is used to summarize certain communications data, and thereby reduce the number of items displayed to the user, using various techniques. This includes handling comments (e.g., of a communications thread) within the timeline, and the concept of item rollups, as described below.

With respect to a comment that adds to a thread, one implementation may show the comments inline, whereby a user can see a comment (e.g., the most recent), along with a count (e.g., 240, FIG. 2) of how many comments exist, such that the user can expand and collapse the additional comments. Such expanding and collapsing helps to prevent the user from losing his or her place in the timeline. Note that in an alternative implementation, the user may select the timeline item (e.g., click on the item or the comments count) to be navigated to a view containing the comments.

Note that whenever a comment is added to a thread, in one implementation, the entire thread moves ahead in the timeline based upon the time of the latest comment relative to other communications data. This keeps the timeline synchronized with respect to what is most current from the perspective of the user.

The concept of item rollups is generally based on the likelihood that certain sources are less important to the user, and/or tend to have too many communication instances (are overly "chatty"). For such sources, rather than display an item for each communication, only a single instance of the item (e.g., the most recent) is displayed to the user. The display may be such that the item indicates that it is a rolled up item, e.g., by highlighting, bolding, via a different color and so forth. In FIG. 1, this is represented by a user action 130 that selects which sources and/or types of items are to be rolled up into a rolled up item, which is then maintained as rollup data 132 for use by the system in rendering the timeline view.

When change is made to an item that is rolled up with other items, e.g., new content is available, the most recent item in the rolled up items is used for positioning the rolled up item in the timeline. In this way, any time new content becomes available, the timeline is re-arranged so as to keep the items synchronized in time.

By way of example, consider a news feed service that regularly outputs new content, e.g., on the order of a hundred per day. If an item is added to the timeline for each new piece of content, the timeline will be overwhelmed with items from that service, whereby other communications will be difficult to find. Rolling up the items into a rolled up item allows a single item on the timeline for that news feed service; the user can still access the individual pieces of content, e.g., by clicking on the rolled up item.

Instead of a service, content from an individual source (e.g., one person) may be rolled up into a single item. For example, an acquaintance who is particularly prolific (chatty, possibly to the point of spamming) in posting content may have his or her blog items rolled up so as to not see the many individual items from that acquaintance in the timeline. Further, rollups may be time-based, e.g., to rollup each day's communication data (including other rollups) into a single item once that communication data is more than a week old. Further, an algorithm may rollup certain items and not others, e.g., items that have not been interacted with in the last three days may be rolled up.

Figure 3:
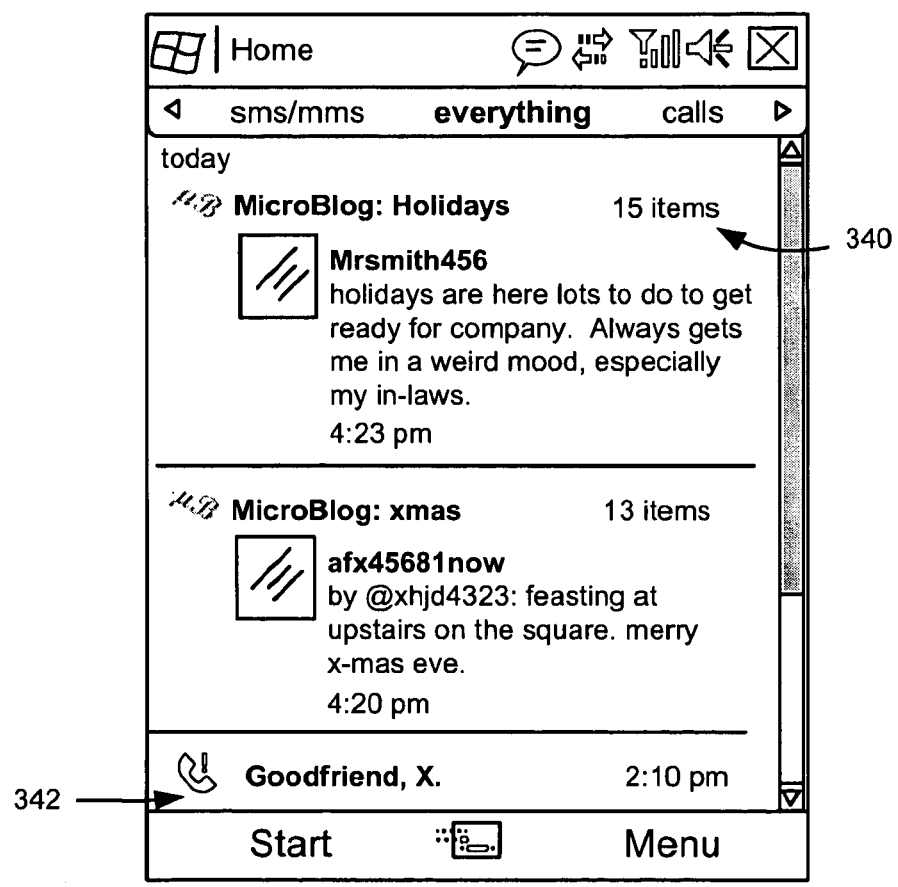
FIG. 3 is an example of a rolled up item of timeline view expanded for interaction with the individual communication data items of the rolled up item.

FIG. 3 illustrates one example of how rolled up items can be displayed for the user, e.g., by showing the number of items 340 that are in the rolled up item displayed in the timeline. If a rolled up item is clicked, the user is navigated to a view containing the corresponding items. Note that the items within a rolled up item may include comments; these may be presented as only the first comment with additional interaction needed to view other comments as described above, or in a different way, e.g., all comments shown once an item within a rolled up item is selected.

Note that the timeline in FIG. 3 also shows a missed telephone call via the entry/item labeled 342, to illustrate how different sources are aggregated into the single timeline view. In general, only missed calls are included in the timeline, and not others. However, the user may choose to see incoming calls, outgoing calls, or all calls. Further, calls for a given user or designated group of users may be rolled up, so that the user can see a call history (e.g., containing missed, incoming and/or outgoing calls) as desired.

In one aspect, multiple sources and/or types may be grouped and rolled up together. For example, a user may want to have content from a news feed service grouped with content from a sports feed service. A user may want individuals grouped together for rollup, e.g., employees may be grouped differently so as to have only a single item appear on the timeline for employee communications. A person can belong to more than one group, e.g., a person in an employee group can also be in a friend group, whereby his communications (items) appear in more than one rolled up item; an item may thus be in more than one rolled up item. Also, this allows the different identities associated with a user to be grouped together, e.g., a person may have a telephone number, contact data, social networking identifier and so forth, each of which can be included in a group (even if the group is only for that one person's differing identities) so that communication data from that person appears in the timeline as being from the same source.

Moreover, certain types of communications of a person or service may be grouped, but not others. For example, the social networking posts of another person may be grouped, but not text messages from that person, even though other persons may have all of their communications grouped.

Different types of communications from the same source (individual or group) may be rolled up differently. For example, a user may want social networking content from a particularly chatty person rolled up, however any text messages from that person are not to be rolled up, but included as distinct items in the timeline.

Timeline items that are displayed to the user are either actionable or non-actionable. Actionable items can be replied to or commented on, with the text of the comment being sent to the service that originated the item. Non-actionable items are read only and cannot be commented on by the user.

Figure 4:
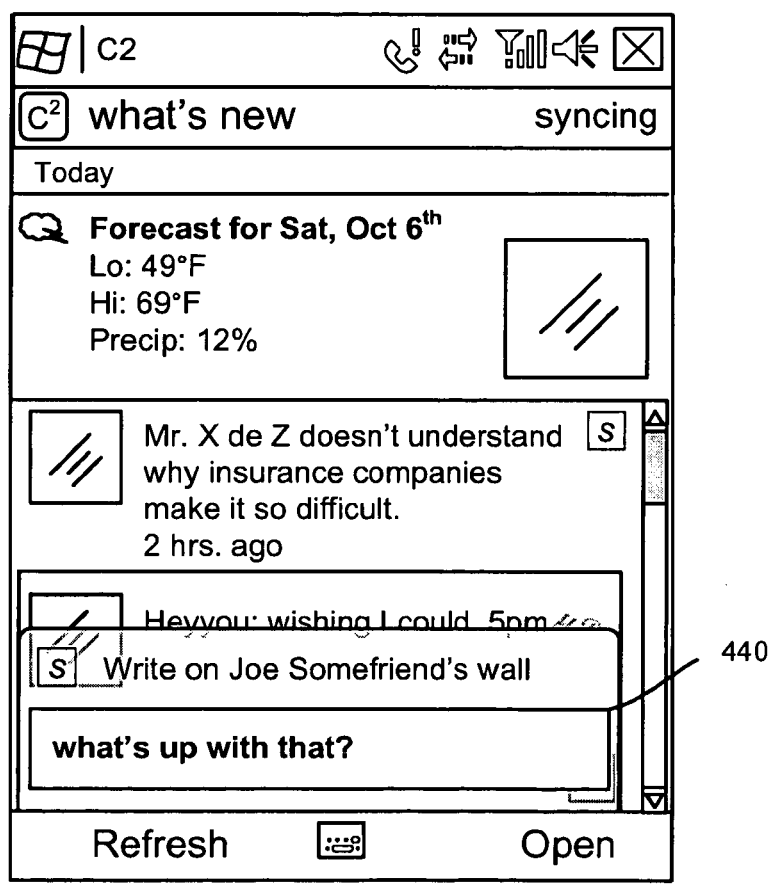
FIG. 4 is an example of a text editor that may be used for two-way communication with respect to an aggregated timeline item.

When the user takes action on an actionable item, the user may be presented with a popup editor 440, as generally represented in FIG. 4. This editor 440 streamlines the process of replying to items in the timeline by keeping the user in the view.

Note that the two-way communication may be automatically performed on the corresponding service (e.g., an SMS message is sent in response to interacting with a received SMS message). However, the user may be given the opportunity to change the sending service. Indeed, some content such as an RSS feed is read-only; the user may want to comment on that feed to some friends via another sending service. The user may interact to select a desired sending service.

Figure 5:
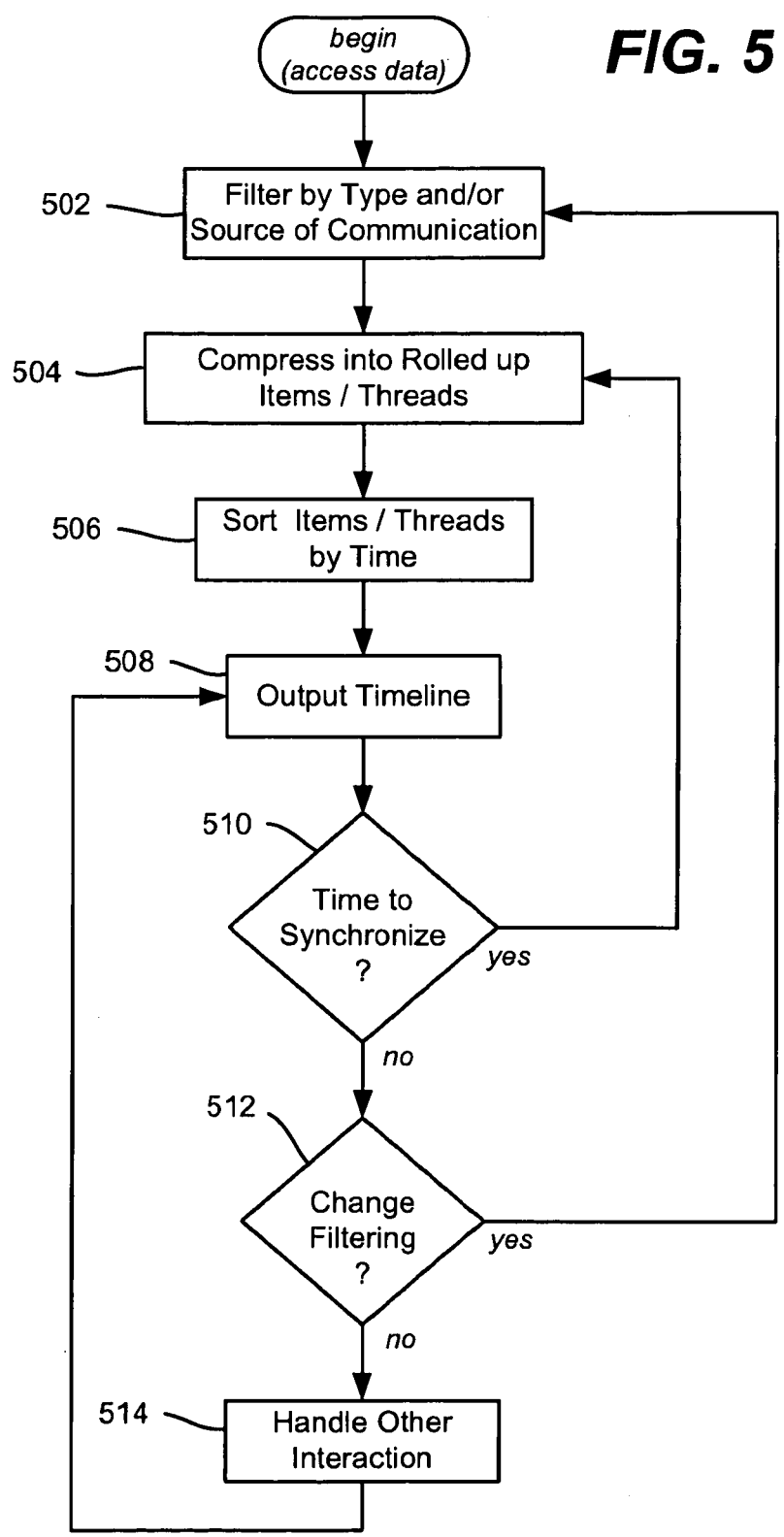
FIG. 5 is a flow diagram representing example steps for aggregating communication data into a timeline view.

FIG. 5 is a flow diagram showing general example steps that may be taken by the timeline program once the communication data is available for access. In general, step 502 represents filtering by the type and/or source of the communication data, as described above. Step 504 represents timeline compression, including processing the communication data into rolled up items according to the user's selections, and processing each item corresponding to a thread having comments so as to show only one comment accompanied by a count of the number of comments.

Step 506 represents sorting the communication data (e.g., filtered and/or timeline compressed) by each item's timestamp. For an item having rolled up items therein or associated comments, the timestamp of the most recent item or comment is used.

Step 508 represents outputting the timeline, which remains unchanged until new data is synchronized (step 510) or the user interacts in some way with the timeline, such as to change the filtering (step 512). Other user interactions are not described individually but for brevity are represented by step 514. Such other user interactions include scrolling, editing/replying, selecting a rolled up item or commented item to see the "embedded" content, entering user preference data and/or rollup selections, and so forth.

With respect to data synchronization at step 510, this may be event driven, such as by various timers and events as new content (e.g., on demand for an SMS message or missed call) is received, rather than in a loop as exemplified in FIG. 5. As described above, different sources and/or types of communication data may be synchronized at different times and in different ways.

As can be seen, there is described a timeline system including a user interface that gives an overview for a user's aggregated communication data in a timeline view. The user thus has a unified way to view his or her communication data, via a consistent timeline (i.e., feed) across these items, as well as a uniform way to respond back to messages and notifications from different services and applications.

The system facilitates cloud aggregation and device aggregation which allows for a timeline of services, device notifications, as well as notifications from other machines or "private" systems such as an enterprise. The user interface provides the ability to write back and respond to each message type or service type that may match the content's type, e.g., writing back to a social networking service, sending an SMS message in response to an SMS message, and so forth.

Moreover, the system allows timeline compression to collapse items in the timeline, e.g., to reduce "spamming" by a particular source or person, and/or to summarize the feed overall as it goes back in time to show fewer, likely more important items. This can be automatic or manual. At the same time, not only are communications from various remote sources aggregated, but there is provided the ability for programs and other services to add communication data comprising events to the timeline view.

Exemplary Operating Environment

Figure 6:
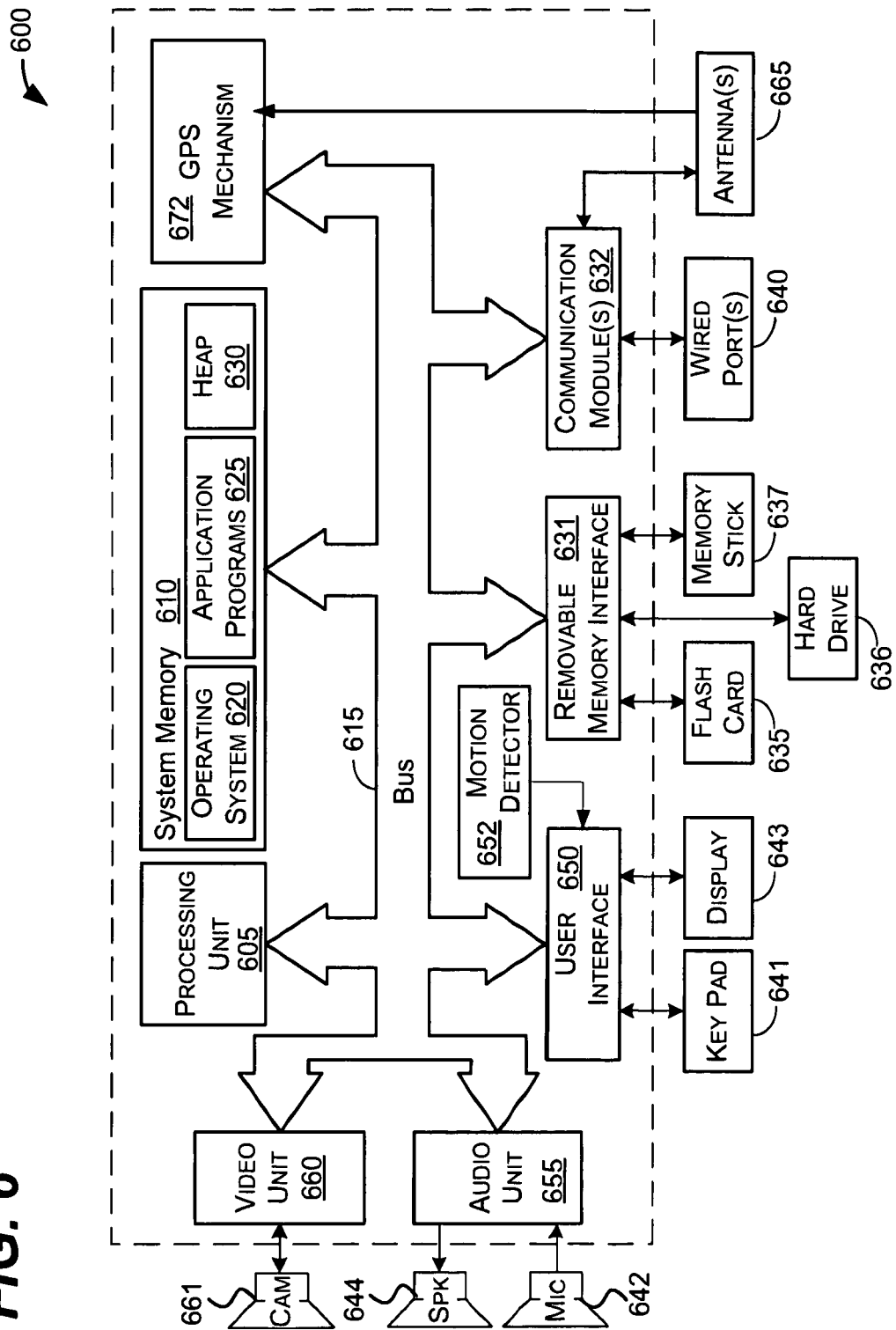
FIG. 6 shows an illustrative example of a mobile computing device/environment into which various aspects of the present invention may be incorporated.

FIG. 6 illustrates an example of a suitable mobile device 600 on which aspects of the subject matter described herein may be implemented. The mobile device 600 is only one example of a device and is not intended to suggest any limitation as to the scope of use or functionality of aspects of the subject matter described herein. Neither should the mobile device 600 be interpreted as having any dependency or requirement relating to any one or combination of components illustrated in the exemplary mobile device 600.

With reference to FIG. 6, an exemplary device for implementing aspects of the subject matter described herein includes a mobile device 600. In some embodiments, the mobile device 600 comprises a cell phone, a handheld device that allows voice communications with others, some other voice communications device, or the like. In these embodiments, the mobile device 600 may be equipped with a camera for taking pictures, although this may not be required in other embodiments. In other embodiments, the mobile device 600 comprises a personal digital assistant (PDA), hand-held gaming device, notebook computer, printer, appliance including a set-top, media center, or other appliance, other mobile devices, or the like. In yet other embodiments, the mobile device 600 may comprise devices that are generally considered non-mobile such as personal computers, servers, or the like.

Components of the mobile device 600 may include, but are not limited to, a processing unit 605, system memory 610, and a bus 615 that couples various system components including the system memory 610 to the processing unit 605. The bus 615 may include any of several types of bus structures including a memory bus, memory controller, a peripheral bus, and a local bus using any of a variety of bus architectures, and the like. The bus 615 allows data to be transmitted between various components of the mobile device 600.

The mobile device 600 may include a variety of computer-readable media. Computer-readable media can be any available media that can be accessed by the mobile device 600 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 600.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 610 includes computer storage media in the form of volatile and/or nonvolatile memory and may include read only memory (ROM) and random access memory (RAM). On a mobile device such as a cell phone, operating system code 620 is sometimes included in ROM although, in other embodiments, this is not required. Similarly, application programs 625 are often placed in RAM although again, in other embodiments, application programs may be placed in ROM or in other computer-readable memory. The heap 630 provides memory for state associated with the operating system 620 and the application programs 625. For example, the operating system 620 and application programs 625 may store variables and data structures in the heap 630 during their operations.

The mobile device 600 may also include other removable/non-removable, volatile/nonvolatile memory. By way of example, FIG. 6 illustrates a flash card 635, a hard disk drive 636, and a memory stick 637. The hard disk drive 636 may be miniaturized to fit in a memory slot, for example. The mobile device 600 may interface with these types of non-volatile removable memory via a removable memory interface 631, or may be connected via a universal serial bus (USB), IEEE 6394, one or more of the wired port(s) 640, or antenna(s) 665. In these embodiments, the removable memory devices 635-637 may interface with the mobile device via the communications module(s) 632. In some embodiments, not all of these types of memory may be included on a single mobile device. In other embodiments, one or more of these and other types of removable memory may be included on a single mobile device.

In some embodiments, the hard disk drive 636 may be connected in such a way as to be more permanently attached to the mobile device 600. For example, the hard disk drive 636 may be connected to an interface such as parallel advanced technology attachment (PATA), serial advanced technology attachment (SATA) or otherwise, which may be connected to the bus 615. In such embodiments, removing the hard drive may involve removing a cover of the mobile device 600 and removing screws or other fasteners that connect the hard drive 636 to support structures within the mobile device 600.

The removable memory devices 635-637 and their associated computer storage media, discussed above and illustrated in FIG. 6, provide storage of computer-readable instructions, program modules, data structures, and other data for the mobile device 600. For example, the removable memory device or devices 635-637 may store images taken by the mobile device 600, voice recordings, contact information, programs, data for the programs and so forth.

A user may enter commands and information into the mobile device 600 through input devices such as a key pad 641 and the microphone 642. In some embodiments, the display 643 may be touch-sensitive screen and may allow a user to enter commands and information thereon. The key pad 641 and display 643 may be connected to the processing unit 605 through a user input interface 650 that is coupled to the bus 615, but may also be connected by other interface and bus structures, such as the communications module(s) 632 and wired port(s) 640. Motion detection 652 can be used to determine gestures made with the device 600.

A user may communicate with other users via speaking into the microphone 642 and via text messages that are entered on the key pad 641 or a touch sensitive display 643, for example. The audio unit 655 may provide electrical signals to drive the speaker 644 as well as receive and digitize audio signals received from the microphone 642.

The mobile device 600 may include a video unit 660 that provides signals to drive a camera 661. The video unit 660 may also receive images obtained by the camera 661 and provide these images to the processing unit 605 and/or memory included on the mobile device 600. The images obtained by the camera 661 may comprise video, one or more images that do not form a video, or some combination thereof.

The communication module(s) 632 may provide signals to and receive signals from one or more antenna(s) 665. One of the antenna(s) 665 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 672. In turn, the GPS mechanism 672 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 600 may connect to one or more remote devices. The remote devices may include a personal computer, a server, a router, a network PC, a cell phone, a media playback device, a peer device or other common network node, and typically includes many or all of the elements described above relative to the mobile device 600.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method performed on at least one computing device, comprising:
   aggregating communication data from a plurality of communication sources;

compressing at least two pieces of communication data into a compressed item; and outputting a timeline representation of the data as items, including the compressed item, to a user interface.

2. The method of claim 1 wherein aggregating the communication data comprises combining communication data from a website with communication data from a telephone service.

3. The method of claim 1 wherein compressing comprises rolling up communication data from a common source into the compressed item.

4. The method of claim 1 wherein compressing comprises rolling up communication data of a common type into the compressed item.

5. The method of claim 1 wherein compressing comprises displaying an item as an entry in the timeline, with less than a total number of comments associated with that item displayed with that entry.

6. The method of claim 1 further comprising, filtering the communication data so as to include only items corresponding to a certain type of the communication data.

7. The method of claim 1 further comprising, filtering the communication data so as to include only items corresponding to a certain source of the communication data.

8. The method of claim 1 further comprising, synchronizing to update the communication data, including synchronizing at least one type of communication data at a synchronization interval.

9. The method of claim 1 further comprising, expanding the compressed item into other visible communication data based upon interaction with the compressed item.

10. The method of claim 1 further comprising, providing a communication mechanism for replying to an item.

11. In a computing environment, a system comprising:
one or more processors;
a timeline program, implemented on the one or more processors, configured to aggregate communication data from different sources and output a representation of the communication data as items on an interactive timeline interface, in which the items are sorted by time, the timeline program configured to output the items based upon rollup data, including rolling up at least two items from a common source into a single rolled up item for output, in which interaction with the single rolled up item provides access to each of the items corresponding to the rolled up item.

12. The system of claim 11 wherein the different sources include remote data sources, including web content and telephone service content.

13. The system of claim 11 wherein the different sources include at least one application program.

14. The system of claim 11 wherein the timeline program includes filtering logic configured to filter the communication data to include only items corresponding to a certain type of the communication data, or to include only items corresponding to a certain source of the communication data, or only items corresponding to a certain type and a certain source of the communication data.

15. The system of claim 11 further comprising an editor configured to send a reply to an item.

16. The system of claim 11 wherein the interactive timeline interface displays a representation of a source of a data item, or a representation of a type of a data item, or both a representation of a source of a data item and a type of the data item.

17. One or more computer storage devices having computer-executable instructions, which in response to execution by a computer, cause the computer to perform steps, comprising:
synchronizing to obtain communication data from a plurality of sources;
aggregating the communication data into a set of items;
compressing at least part of the communication data into one or more compressed data items; and
displaying a timeline that shows the set of items including the one or more compressed items arranged by time.

18. The one or more computer storage devices of claim 17 having further computer-executable instructions comprising:
filtering the communication data to display on the timeline only items corresponding to a certain type of the communication data, or to display only items corresponding to a certain source of the communication data, or only items corresponding to a certain type and a certain source of the communication data.

19. The one or more computer storage devices of claim 17 wherein compressing at least part of the communication data comprises rolling up items from a common source into a compressed data item.

20. The one or more computer storage devices of claim 17 wherein compressing at least part of the communication data comprises rolling up items from a group into a compressed data item.

\* \* \* \* \*